(12) United States Patent
Takita

(10) Patent No.: US 6,962,185 B2
(45) Date of Patent: Nov. 8, 2005

(54) DEVICE FOR STICKING PROTECTIVE SHEET ON SUBSTRATE SURFACE

(75) Inventor: Shinya Takita, Kumamoto (JP)

(73) Assignee: NEC Electronics Corporation, Kanagawa (JP)

(*) Notice: Subject to any disclaimer, the term of this patent is extended or adjusted under 35 U.S.C. 154(b) by 0 days.

(21) Appl. No.: 10/322,468

(22) Filed: Dec. 19, 2002

(65) Prior Publication Data
US 2003/0118685 A1    Jun. 26, 2003

(30) Foreign Application Priority Data
Dec. 26, 2001    (JP) ............................. 2001-395350

(51) Int. Cl.[7] .............................................. H01L 21/00
(52) U.S. Cl. ................... 156/515; 156/522; 156/527; 156/530; 156/251; 29/25.01
(58) Field of Search ............................... 156/515, 251, 156/267, 270, 292, 308.4, 522, 527, 530; 29/25.01

(56) References Cited

U.S. PATENT DOCUMENTS 6,080,263 A * 6/2000 Saito et al. ................. 156/253

FOREIGN PATENT DOCUMENTS

| JP | 60-231328 | * 11/1985 |
| JP | 8-148452 | 6/1996 |
| JP | 2000-38556 | 2/2000 |

* cited by examiner

*Primary Examiner*—Linda Gray
(74) *Attorney, Agent, or Firm*—Young & Thompson

(57) ABSTRACT

The device for sticking a protective sheet on the substrate surface according to the present invention comprises a sticking unit for sticking a surface protective sheet on a semiconductor wafer, and a thermocompression and cutting unit which conducts thermocompression bonding for the periphery of the semiconductor wafer and cuts the surface protective sheet along the edge of the semiconductor wafer.

4 Claims, 7 Drawing Sheets

DEVICE FOR STICKING PROTECTIVE SHEET ON SUBSTRATE SURFACE

BACKGROUND OF THE INVENTION

1. Field of the Invention

The present invention relates to a device for sticking a protective sheet on the substrate surface.

2. Description of the Prior Art

When the back face of a semiconductor wafer (also referred to simply as wafer hereinafter) is ground and polished, it is necessary to protect the front face of the substrate in order to avoid damage, and contamination caused by ground dust generated during the grinding work, grinding fluid, or the like. Moreover, the wafer after grinding and polishing has a problem in that it tends to be broken rather easily even by a slight external force because of its surface being irregular due to device pattern, in addition to its being thin and fragile.

For the purpose of protecting the surface during such a wafer processing, a method of sticking a plastic protective tape (protective sheet) made of resin on the surface is well-known as a general technology. Such a technique is disclosed in, for example, Japanese Patent Applications Laid Open, No. Hei 8-148452.

Now, the surface of a wafer in recent years has a conspicuous irregularity due to a pattern formed on the surface. For example, in a wafer with a polyimide film, the thickness of the film is 5 to 20 $\mu$m, and the regions of removal of the polyimide film extend even to the outer periphery of the wafer, in an electrode pad section formed in the outer peripheral portion of the pattern for establishing connection with the distributed wires, and in grooves (scribe lines) for chip dicing. Here, the width of the groove is about 50 to 100 $\mu$m.

However, even though the surface of the wafer is bonded with a protective surface according to the conventional technique as described in the above, the sheet cannot follow the irregularity of the surface of the semiconductor substrate, resulting in an incomplete adhesion between the protective sheet and the wafer surface.

Referring to FIG. 8, this situation will be described. FIG. 8A is a plan view of a wafer with a protective sheet stuck on, and FIG. 8B is a sectional view at the outer periphery of the wafer. As shown in FIG. 8A, the entire surface of a wafer 101 is bonded with a hatched surface protective sheet 102 by a pressure bonding technique.

When a region 103 shown in FIG. 8A is cut along the outer periphery of the wafer and enlarged, it looks as shown in FIG. 8B. A passivation film 104 composed of a polyimide film is formed on the surface of the wafer 101, and a scribe line 105 is formed in the passivation film 104. The passivation film 104 is bonded from above-by the surface protective sheet 102 consisting of an adhesion layer 106 and a protective layer 107.

However, in the scribe line 105 part having an irregularity, the wafer surface is not fully bonded with the adhesive layer 106, and a gap 108 is thus created. Because of this, during grinding and polishing of the back face of the wafer, the surface of the electrode pad is contaminated by the ground dust or grinding fluid that infiltrates through the gap 108. Presence of such a contamination leads to frequent occurrence of connection failure between the electrode pad and the distributed wires.

Under these circumstances, Japanese Patent Applications Laid Open, No. 2000-038556 discloses a means of filling in the irregularity, in which a sheet having a pressure sensitive adhesion layer that can be melted at a specified melting point and can follow the irregularity is stuck on the wafer, and the entire surface of the wafer is heated.

Since, however, the heating method adopted by the disclosure is one in which all the irregularities are filled by heating the entire surface of the wafer, the adhesive strength of the sheet is enhanced to such an extent that the possibility of cracking the wafer at peeling of the sheet is increased under the condition that the thickness of the wafer after the grinding and polishing is small. Moreover, since the electrode pad for bonding the distributed wires at assembly is formed of a metal with low resistance (mainly aluminum), its surface is oxidized by being heated, forming an insulator layer of metal oxides, which becomes the cause of conduction failure.

BRIEF SUMMARY OF THE INVENTION

Summary of the Invention

The device for sticking a protective sheet on the substrate surface according to the present invention has a sticking unit for sticking a protective sheet on a semiconductor wafer, and a thermocompression and cutting unit which conducts thermocompression bonding for the periphery of the semiconductor wafer and cuts the surface protective sheet along the edge of the semiconductor wafer.

BRIEF DESCRIPTION OF THE DRAWINGS

The above-mentioned and other objects, features and advantages of this invention will become more apparent by reference to the detailed description of the invention taken in conjunction with the accompanying drawings, wherein.

DETAILED DESCRIPTION OF THE INVENTION

Figure 1:
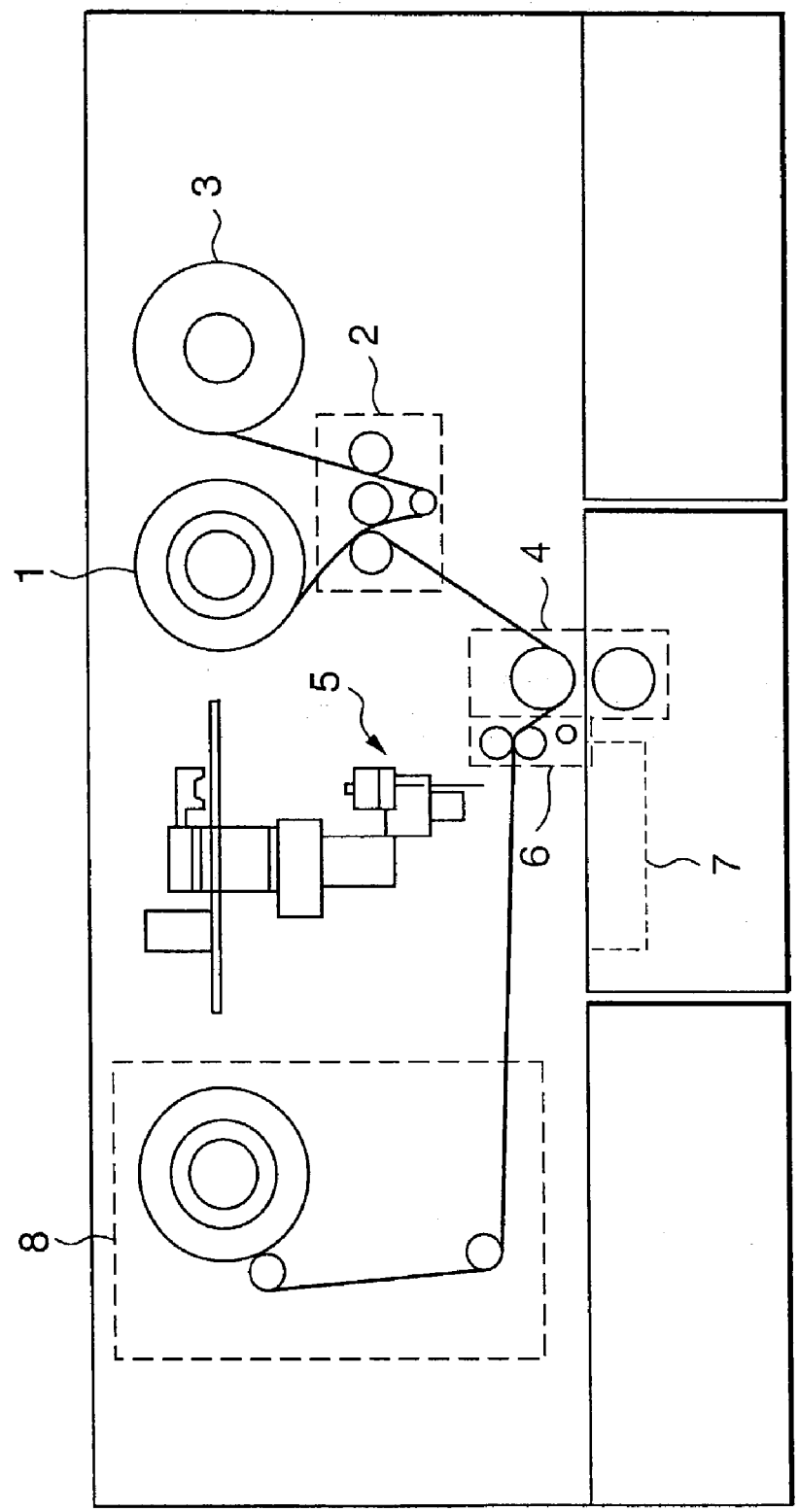
FIG. 1 is a general view of the device for sticking a surface protective sheet on the substrate surface for describing the present invention.

Referring to FIG. 1 to FIG. 4, a first embodiment of the present invention will be described, wherein FIG. 1 is a general view of the device for sticking a protective sheet on the substrate surface.

First, FIG. 1 will be described briefly. The device for sticking a protective sheet on the substrate surface comprises a surface protective sheet feeding section 1, a surface protective sheet peeling roller section 2, a surface protective sheet take-up section 3, a surface protective sheet sticking roller section 4, an adhesion and cutting section 5, a stuck sheet peeling roller section 6, a stick-on stage 7, and a stuck sheet remainder take-up section 8. This invention differs from the device for sticking a protective sheet on the substrate surface according to the conventional technology in the configuration of the adhesion and cutting section 5, with the remaining construction may be left the same.

Figure 2:
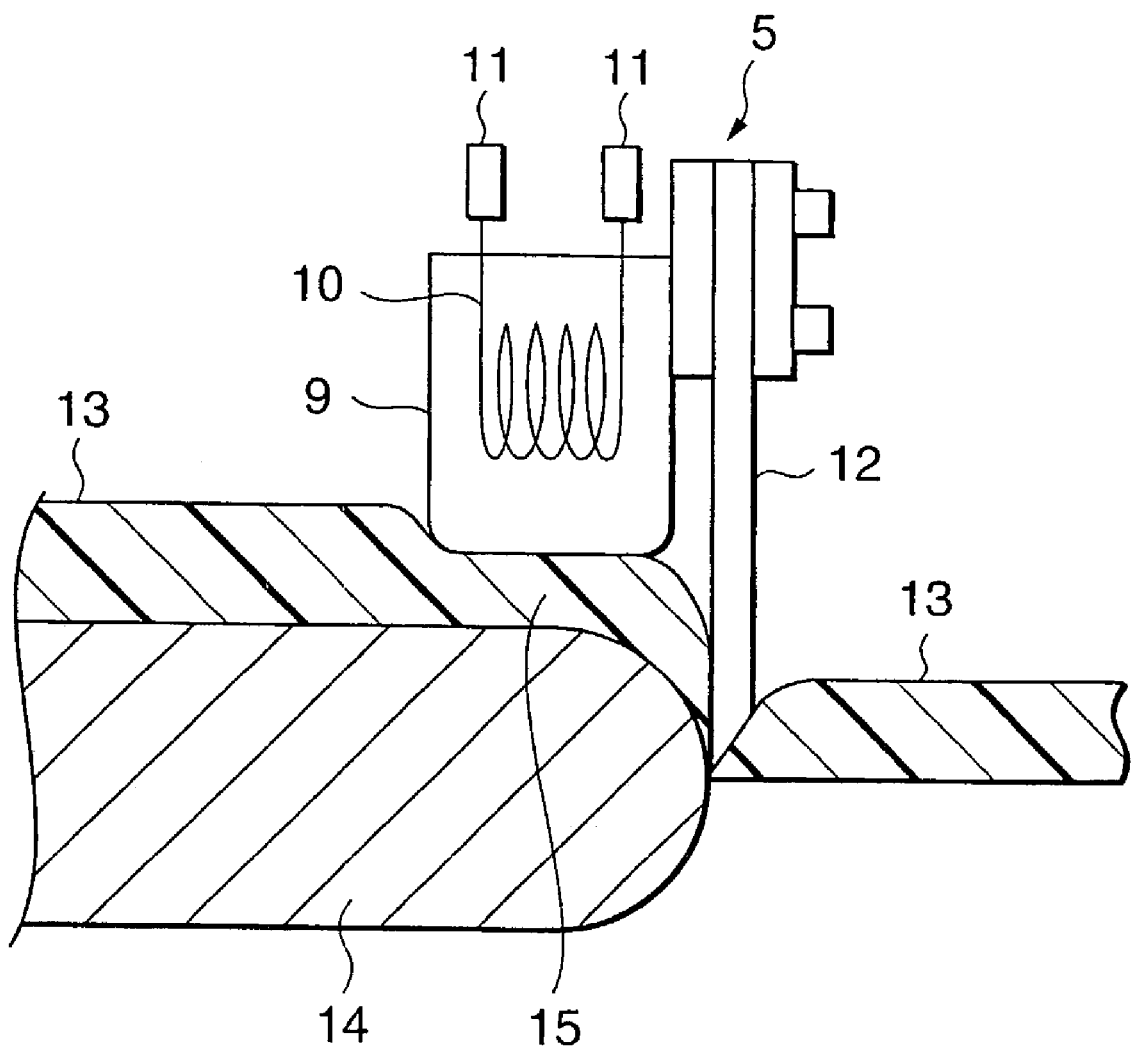
FIG. 2 is a sectional view of an adhesion and cutting section and cutting operation of the surface protective sheet for describing a first embodiment of the invention.

Now, referring to FIG. 2, the structure of the adhesion and cutting section 5 will be described. The adhesion and cutting section 5 is a heater block 9 formed of a material with good thermal conductivity in which a heating coil 10 is embedded, and is equipped with a power terminal 11 for feeding power to the coil. In addition, a cutter 12 for cutting the surface protective sheet is installed fixed to the heater block 9. By means of the adhesion and cutting section 5, a surface protective sheet 13 is subjected to thermocompression bonding to a wafer 14 at its outer periphery, and at the same time it is cut off at the edge of the wafer. Here, the heater block 9 is formed of a metallic body with high thermal conductivity such as copper or stainless steel.

Figure 3:
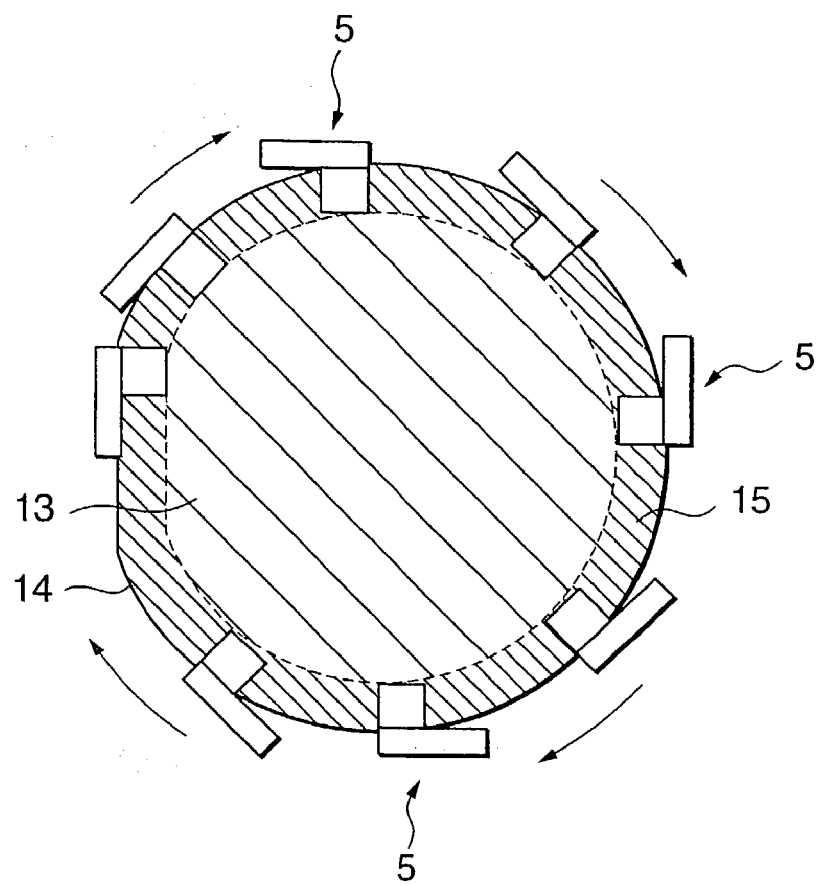
FIG. 3 is a plan view for describing the motion of the adhesion and cutting section in cutting the surface protective sheet along the wafer, for describing the embodiments of the invention.
Figure 4:
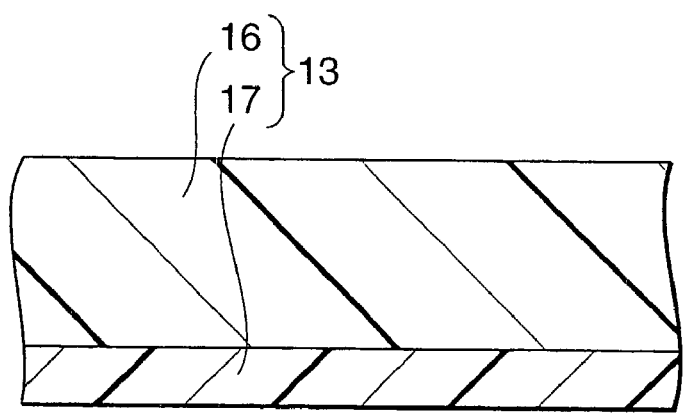
FIG. 4 is a sectional view showing the structure of the surface protective sheet.

Next, referring to FIG. 1 to FIG. 4, sticking method and adhering method to the wafer periphery, of the surface protective sheet of the invention will be described in detail. FIG. 3 is a plan view for describing the motion of the adhesion and cutting section 5 for cutting, while thermally compression bonding the surface protective sheet 13 along the outer periphery of the wafer. FIG. 4 is a sectional view showing the structure of the surface protective sheet 13.

In the device for sticking a protective sheet on the substrate surface shown in FIG. 1, the wafer 14 is transported within the sticking device with its surface side, where semiconductor devices are formed, facing upward. The surface protective sheet is fed from the surface protective sheet feeding section 1, a dry prevention sheet provided for preventing drying of the adhesive is peeled off by the surface protective sheet peeling roller section 2, and the peeled surface protective sheet is wound around the surface protective sheet take-up section 3. The surface protective sheet with its adhesive exposed is sent to the surface protective sheet sticking roller section 4 together with the wafer, where the wafer surface and the protective sheet are bonded together, namely, the wafer is laminate coated with the surface protective sheet by being pinched between the rollers. The laminate coated wafer is sent to the stick-on stage 7, and it is fixed there by a suction on its back face.

At this stage, the adhesion and cutting section 5 comes down from above and enters the state of cutting the surface protective sheet. The conditions during the cutting of the sheet is illustrated in FIG. 2. A difference is imparted to the height of the heater block 9 and the height of the cutter 12, and it is possible to change the pressing strength for the pressure sensitive adhesion of the sheet by varying the height of the heater block 9. Moreover, the heater block 9 is heated by means of the heating coil 10 installed within the heater, and the temperature of the heating coil 10 can be changed also by varying the power fed to the coil.

The adhesion and cutting section 5 is moved along the edge of the wafer 14 as shown in FIG. 3. Namely, the heater block 9 of the adhesion and cutting section 5 moves sliding on the surface protective sheet 1 along the periphery of the wafer 14 while subjecting the sheet to thermocompression bonding to the wafer as shown in FIG. 2 and FIG. 3. In this case, static electricity is generated between the heater block 9 and the surface protective sheet 13. For this reason, it is preferable that the heater block 9 is made of a material having an electrical conductivity.

In this way, a pressure sensitive adhesion region 15 is formed as shown in FIG. 3. At the same time, the surface protective sheet 13 is cut off in the manner as shown in FIG. 2. In this case, the width of the adhesion region 15 from the outer periphery of the wafer can be varied by the size of the heater block 9. When the diameter of the wafer is 8", it is appropriate to set the width of the adhesion region 15 at about 3 to 5 mm. The portion of the surface protective sheet 13 pressed by the heater block 9 is heated up to a temperature close to a temperature set for the heater block 9. Under such a condition, the heater block 9 of the adhesion and cutting section 5 moves sliding while conducting thermocompression bonding of the protective sheet to the periphery of the wafer 14. In this case, the sliding motion can be made to occur smoothly by machining round the bottom portion of the heater block 9.

As shown in FIG. 4, the surface protective sheet 13 is composed of a base material (a resin having a softening point higher than that of a pressure sensitive adhesive, or a thermosetting resin) 16 and a pressure sensitive adhesive (thermoplastic resin) 17. As described in the above, by the heating of the heater block 9, the adhesive 17 having a softening point lower than the base material 16 is softened, moves toward the lower pressure region (recessed part of the irregularity), and the recessed part is filled with the adhesive. After the heater moves away, it is cooled naturally, and the adhesive is solidified in the state of filling the recessed part.

If a polyethylene resin having a softening point 120° C. is adopted as the adhesive 17, and a polyacrylonitryl resin having a softening point in the range of 190 to 232° C. is adopted as the base material 16, for example, then by heating the heater block to about 120 to 150° C., it is possible to soften only the polyethylene resin of the adhesive, and fill in the recessed part with it.

When the adhesion and cutting section 5 makes one round of the outer periphery of the wafer 14, the portion of the surface protective sheet which is cut off is separated by the stuck sheet peeling roller section 6, and is wound around the stuck sheet remainder take-up section 8. By the sticking method of the surface protective sheet as described in the above, the surface of the wafer 14 can be bonded with the surface protective sheet 13.

Figure 5A:
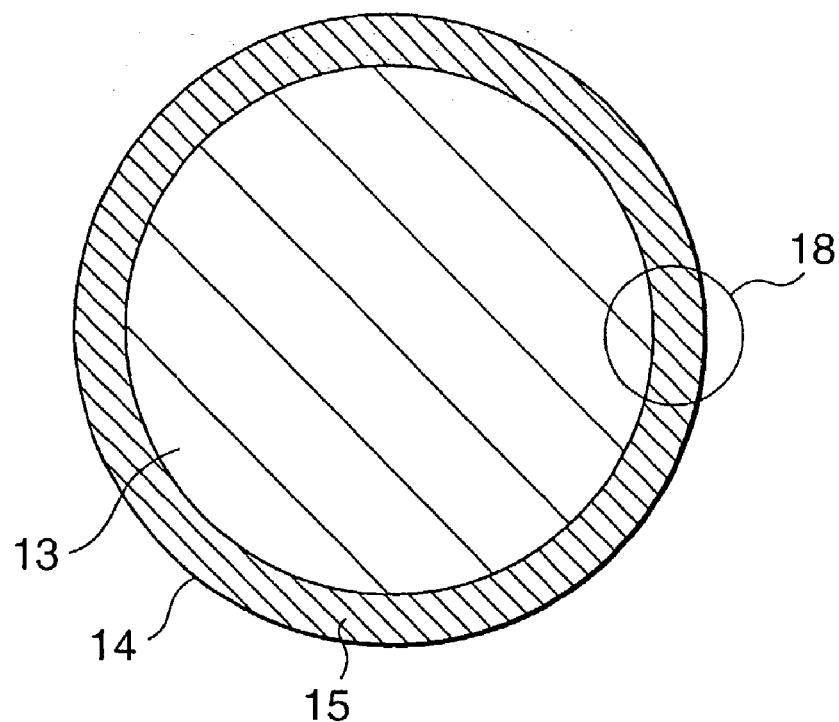
FIGS. 5A and 5B are a plan view of a wafer with the surface protective sheet stuck on, and a sectional view at the outer periphery of the wafer, respectively, for describing the effect of the invention.
Figure 5B:
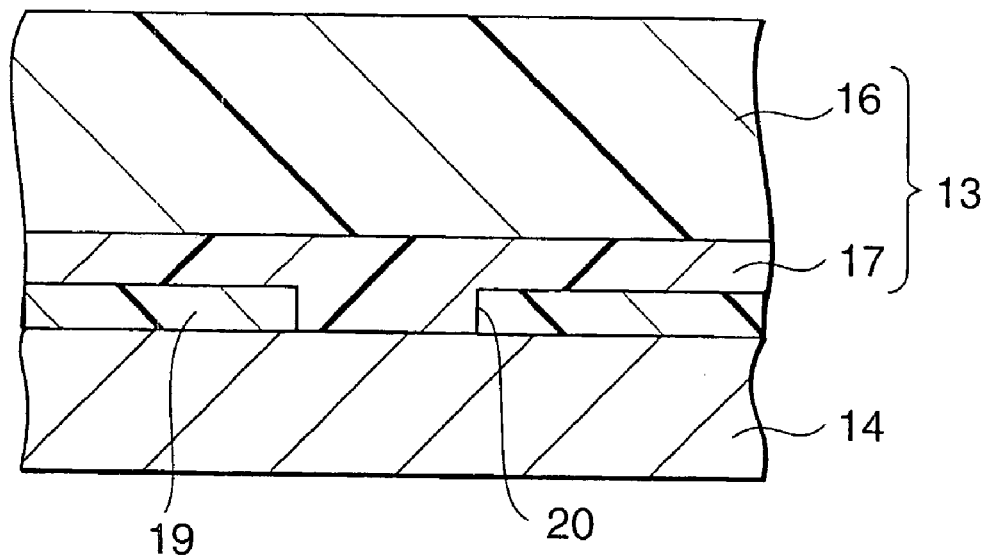

Next, referring to FIG. 5, the principal effect of the present invention will be described. FIG. 5A is a plan view of the wafer with the surface protective sheet stuck on, and FIG. 5B is a sectional view at the outer periphery of the wafer. As shown in FIG. 5A, the entire surface of the wafer 14 is bonded with the surface protective sheet, and in this invention, the adhesion region 15 is provided in the outer periphery of the wafer 14.

When the region 18 shown in FIG. 5A is cut along the outer periphery of the wafer and enlarged, it looks as shown in FIG. 5B. The passivation film as mentioned above is formed on the surface of the wafer 14, and a scribe line 20 is formed in the passivation film 19. The passivation film 19 is bonded with a surface protective sheet 13 consisting of the base material 16 and the adhesive 17. In this invention, the periphery of the wafer 14 is subjected to a heating treatment, so that the recessed part of the scribe line 20 is filled with the adhesive 17 as described in the above. In this manner, the possibility of formation of the gap 108, which occurs in the conventional technology, can be eliminated completely.

Now, the effects of the present invention will be enumerated as follows. Namely, a first effect is that occurrence of oxidation of the metal, which results in the formation of an insulating substance, on the surface of the electrode pad will be eliminated, and it is possible to fill in the recessed part through softening of the adhesive. As a result, it is possible to prevent infiltration of ground dust and grinding fluid, which may occur in connection with grinding and polishing of the back face of the wafer. This is because only the periphery of the wafer is heated and the effective device chips are not heated.

A second effect is that the adhesive strength of the surface protective sheet is not so much increased that it is possible to suppress the occurrence of unpeeled portions and cracks in the wafer at peeling of the sheet. This is because the adhesive strength is enhanced only in the outer periphery of the wafer that is heated, so that only a part of the adhesive is used for filling the irregularity existing on the surface of the wafer, leaving the adhesive strength of the wafer as a whole almost unchanged. Incidentally, at peeling of the sheet, it is general to adopt a method in which the back face of the wafer is sucked, and a peeling tape is bonded on the front face to peel the sheet off along with the peeling tape. In this case, the sucking face has a structure to be sucked more strongly on the periphery than other parts, and the outer periphery of the wafer according to this invention can cope with the peeling strength.

A third effect is that the processing for sticking and thermocompression bonding the protective sheet can be accomplished without adding a process other than that for the sheet sticking work. This is because the heater block is attached to the adhesion and cutting section, so that it is possible to heat the surface protective sheet simultaneous with the cutting operation.

A fourth effect is that the heating width of the wafer can be controlled freely (making it possible to cope with an enlargement of the effective chip region, which means in turn that the device is capable of dealing with enhancement in the yield). This is because the width of heating can be determined by the size of the heater block.

A fifth effect is that it is possible to handle the situation even when the softening temperature of the surface protective sheet is varied. This is because it is possible to control the temperature by varying the power fed to the heating coil that heats the heater block.

Next, a second embodiment of the invention will be described. In the first embodiment, the thermocompression bonding of the wafer edge portion by the adhesion and cutting section 5 is realized through the sliding motion of the heater block 9. The feature of the second embodiment resides in the point that the thermocompression bonding is realized by means of a heating roller at a high temperature.

Figure 6A:
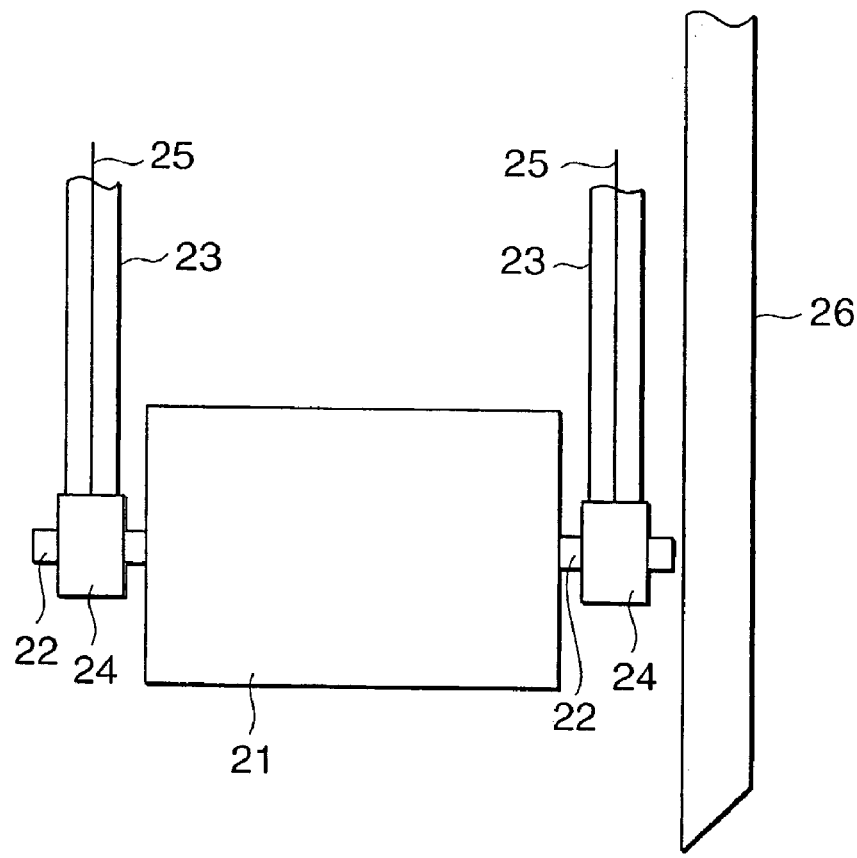
FIGS. 6A and 6B are a front view and a side view, respectively, of an adhesion and cutting section for describing a second embodiment of the invention.
Figure 6B:
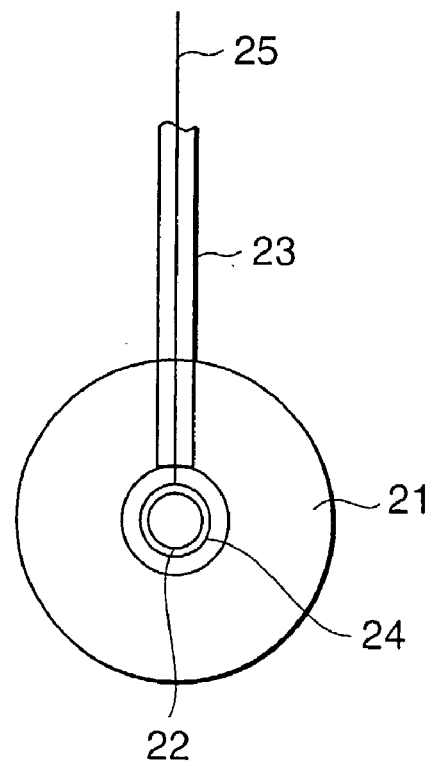

Referring to FIG. 6, the structure of the adhesion and cutting section 5 will be described. Here, FIG. 6A and FIG. 6B are a front view and a side view, respectively, of the adhesion and cutting section 5. As shown in FIG. 6A and FIG. 6B, the adhesion and cutting section 5 has a heating roller 21, made of a material with high thermal conductivity, into which is embedded a metal shaft that can be heated, wherein the heating roller alone is made to rotate. A support tube 23 is connected to a bearing 24, and a heater wire 25 is disposed in the support tube 23. Moreover, a cutter 26 attached firmly to the support tube 23 is provided.

Figure 7A:
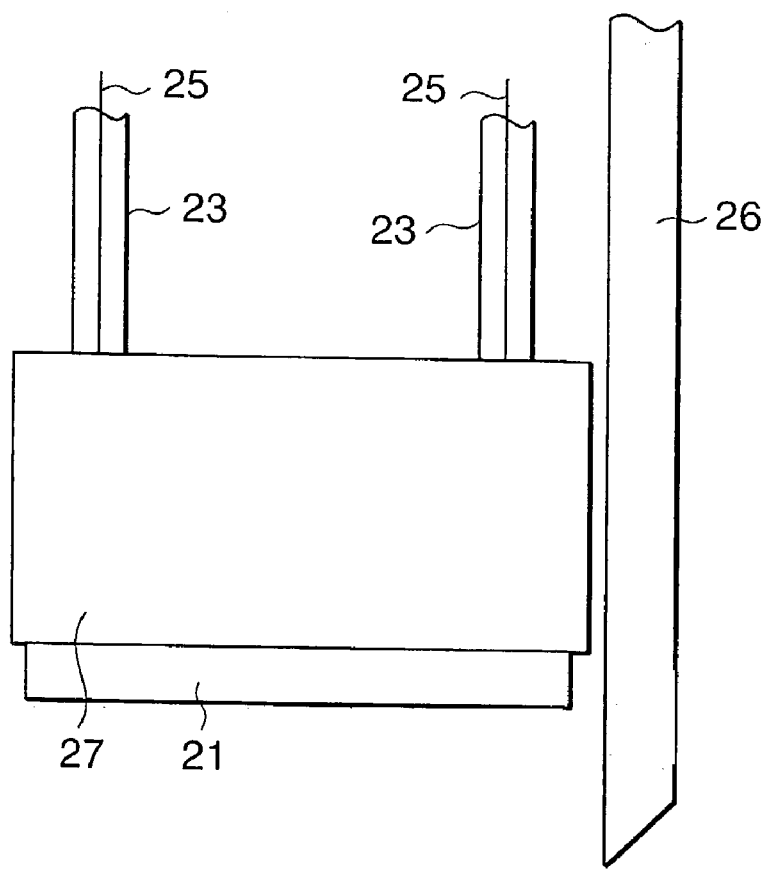
FIGS. 7A and 7B are a front view and a side view, respectively, of another adhesion and cutting section for describing the second embodiment of the invention.
Figure 7B:
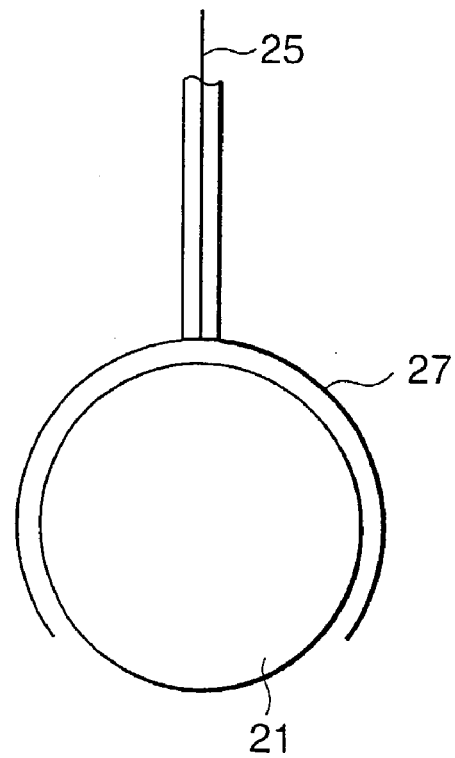
Figure 8A:
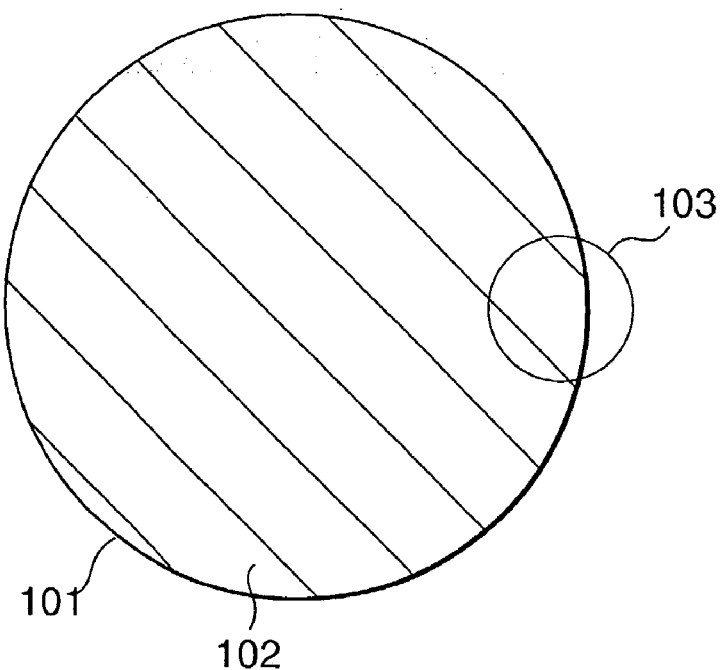
FIGS. 8A and 8B are a plan view of the wafer with a surface protective sheet stuck on, and a sectional view at the outer periphery of the wafer, respectively, for describing the problems in the conventional technology.
Figure 8B:
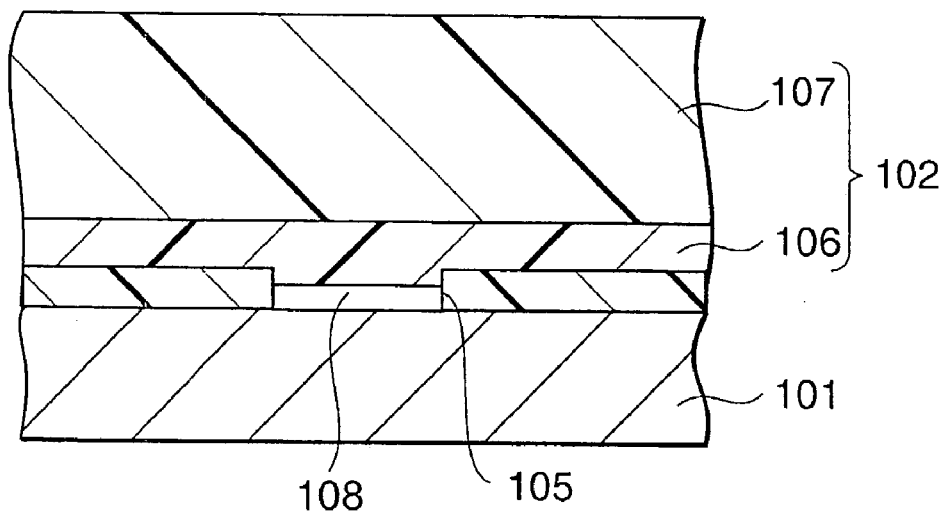

Furthermore, referring to FIG. 7, the structure of another roller-type adhesion and cutting section 5 will be described. Here, FIG. 7A and FIG. 7B are a front view and a side view, respectively, of the adhesion and cutting section 5. As shown in FIG. 7A and FIG. 7B, the adhesion and cutting section 5 has a heating roller 21, made of a material with high thermal conductivity, the surface part of which is covered with, and heated by a metal cover 27 which can be brought to a high temperature, wherein the heating roller 21 alone can be made to rotate around a central shaft (not shown). A support tube 23 mounted with a heater wire 25 is connected to the metal cover 27, and further, a cutter 26 attached firmly to the support tube 23 is provided. Here, the heating roller 21 is formed of a metallic body with high thermal conductivity such as copper or stainless steel.

In the second embodiment, in sticking the surface protective sheet 13 on the wafer, the heating roller 23 of the adhesion and cutting section 5 moves along the edge of the wafer 14 as shown in FIG. 3. In other words, as shown in FIG. 2 and FIG. 3, the heating roller 21 of the adhesion and cutting section 5 moves revolving along the periphery of the wafer 14 while conducting thermocompression bonding. In this operation, the adhesion region 15 is formed as shown in FIG. 3, and at the same time, the surface protective sheet 13 is cut off as shown in FIG. 2.

In the second embodiment, the heating roller 21 presses down the base material 16 of the surface protective sheet 13, and conducts thermocompression bonding while revolving along the edge of the wafer. As a result, catching of the heating roller 21 by the surface protective sheet will never happen, and hence this invention is satisfactorily applicable to mass production of semiconductor devices.

As described in the above, according to the present invention, after sticking the surface protective sheet, namely, after laminate coating the surface protective sheet, the outer periphery alone of the semiconductor wafer is heated by a heater to the softening point of the adhesive, the recessed part in the wafer periphery is filled with the adhesive, infiltration of the grinding fluid and ground dust generated during the grinding and polishing of the back face into the surface of the wafer is prevented, and the treatment of the electrode pad surface can be completed without causing modification or contamination of the surface of the wafer. Moreover, the recessed part to be filled with the adhesive is put under control to a minimum necessary extent, so that the force to be applied at peeling of the sheet remains substantially the same as that in the conventional method, and is capable of suppressing the occurrence of wafer cracks.

The present invention is not limited to the form in which the heater block 9 or the heating roller 21 heats and conducts thermocompression bonding for the outer periphery of the wafer at cutting of the surface protective sheet. An effect similar to the above can also be obtained by a method by which the outer periphery of the wafer 14 is pressed and heated in one stroke, before or after cutting of the surface protective sheet, with an annular body, namely, a body having the shape of the adhesion region 15 as shown in FIG. 5.

Moreover, the heater block 9 or the heating roller 21 is not limited to a metallic body provided that the material has a sufficiently high thermal conductivity and is capable of removing static electricity.

As described in the above, in the present invention, following the laminate coating of the surface protective sheet, the outer periphery alone of the semiconductor wafer is heated by a heater to the temperature of the softening point of the adhesive, and the irregularity in the periphery of the wafer is filled by pressing the peripheral region.

With such an arrangement, it is possible to prevent infiltration of ground dust generated during grinding and polishing, and grinding fluid, and complete the whole processing without modification or contamination of the surface of the electrode pad. Moreover, since the irregularity region to be filled is subjected to a control at a minimum level of treatment, the force to be applied at peeling of the sheet remains substantially the same as that in the conventional method, and the occurrence of cracks in the wafer can be eliminated.

In this way, according to the present invention, mass production of the semiconductor device can be facilitated when the diameter of the semiconductor wafer is increased even to 300 mm.

Although the invention has been described with reference to specific embodiments, this description is not meant to be construed in a limited sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A device for sticking a surface protective sheet on a surface of a semiconductor wafer comprising:
    a sticking unit for sticking said surface protective sheet on said semiconductor wafer; and
    a thermocompression and cutting unit which conducts thermocompression bonding along a peripheral surface of said protective sheet except for a central surface of said protective sheet and cuts said surface protective sheet along the edge of said semiconductor wafer, wherein,
    the portion which conducts the thermocompression bonding of said heat pressing and cutting unit is formed of a metallic body equipped with a heater, and
    said metallic body is of a roller shape.

2. The device for sticking a protective sheet on the substrate surface as claimed in claim 1, wherein the surface of said metallic body to be brought into contact with said surface protective sheet is formed flat and smooth.

3. The device for sticking a protective sheet on the substrate surface as claimed in claim 1, wherein said metallic body is formed of a material containing copper or stainless steel.

4. The device as claimed in claim 1, wherein said surface protective sheet has a base material layer and an adhesive layer, said adhesive layer having a lower softening point than that of said base material layer.

* * * * *